UNITED STATES PATENT OFFICE.

JOHN H. KELLOGG, OF BATTLE CREEK, MICHIGAN.

FOOD PRODUCT AND PROCESS OF PREPARING THE SAME.

1,219,005.  Specification of Letters Patent.  Patented Mar. 13, 1917.

No Drawing.  Application filed January 13, 1916.  Serial No. 71,844.

*To all whom it may concern:*

Be it known that I, JOHN H. KELLOGG, a citizen of the United States, residing at Battle Creek, in the county of Calhoun and State of Michigan, have invented certain new and useful Improvements in Food Products and Processes of Preparing the Same, of which the following is a specification.

This invention relates to improvements in food products and process of preparing the same.

The main objects of this invention are:

First, to provide an improved food product having a relatively large proportion of bran as an ingredient, which is very palatable.

Second, to provide an improved article of food in flaked form having a relatively large proportion of bran as an ingredient.

Third, to provide an improved food product of substantial remedial qualities.

Fourth, to provide a process of making such food product by which it can be economically and satisfactory produced.

Further objects will definitely appear from the detailed description to follow.

The invention is clearly defined and pointed out in the claims.

In the preparation of my improved food I use the following ingredients, preferably in the proportions stated: figs 10 per cent., sugar 10 per cent., salt 3 per cent., a farinaceous substance, preferably in the form of wheat or rice flour, 10 to 15 per cent., and wheat bran 60 to 70 per cent. I preferably combine and treat these ingredients in the following manner:

I reduce figs to a pasty or semi-liquid condition by soaking and crushing or shredding. They may be used raw or cooked. I reduce the starchy material to a like pasty or semi-liquid condition by the addition of water and cooking. The bran is cooked and dried. The sugar, bran, fig and farinaceous materials are then mixed by any suitable means, the mixing being very thorough. The mixture is dried and granulated or divided into relatively small particles and moistened to bring it to a proper "temper" for the flaking operation. After "tempering" the material still retains its granular form and is then passed through flaking rollers and the flakes are toasted or dried in an oven at relatively low temperature. The flakes resulting are thin, crisp and very friable and the food is ready to serve and may be packaged and distributed and used in the well known manner of flaked breakfast foods.

My improved food is very palatable and is particularly desirable as a laxative food. The advantage of figs and bran as a laxative are recognized and my improved food contains both in an attractive and palatable form.

While I prefer to combine the ingredients in approximately the proportions specified, I desire to state that they may be considerably varied and a valuable product still be procured although, of course, the value of the food will be more or less affected by such variation. While the ingredients are most effectively and economically combined by the process I have described I am aware that there are other means of accomplishing the result.

Having thus described my invention, what I claim as new and desire to secure by Letters Patent, is:

1. An article of food in the form of flakes comprising figs, a starch, bran, sugar and salt combined into a mixture in approximately the proportions stated.

2. An article of food in the form of flakes comprising figs, a starch, and bran combined into a mixture in approximately the proportions stated.

3. An article of food comprising figs, a starch material and bran combined in a mixture in approximately the proportion of one part figs, 1 part starch material and 6 parts bran.

4. A cooked article of food in the form of dry flakes, comprising figs, starch and bran.

5. The process of manufacturing an article of food in the form of toasted flakes consisting of reducing figs to a paste or semi-liquid condition, reducing starch to a pasty or semi-liquid condition, mixing such fig and starch materials with bran, and sugar and salt in approximately the proportions stated, reducing such mixture to a granular condition, and flaking and drying the flakes.

6. The process of manufacturing an article of food consisting of reducing figs to a paste or semi-liquid condition, reducing a cereal starch to a paste or semi-liquid condition, mixing such fig and starch materials with bran in approximately the proportions stated, and reducing to dry flakes.

In witness whereof I have hereunto set my hand and seal in the presence of two witnesses.

JOHN H. KELLOGG. [L. S.]

Witnesses:
 Roy V. Ashley,
 Alice G. Kirkland.